(12) United States Patent
Lai et al.

(10) Patent No.: US 7,737,751 B1
(45) Date of Patent: Jun. 15, 2010

(54) PERIPHERY CLOCK DISTRIBUTION NETWORK FOR A PROGRAMMABLE LOGIC DEVICE

(75) Inventors: Gary Lai, Palo Alto, CA (US); Andy L. Lee, San Jose, CA (US); Ryan Fung, Mississauga (CA); Vaughn Betz, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/668,521

(22) Filed: Jan. 30, 2007

Related U.S. Application Data

(60) Provisional application No. 60/823,556, filed on Aug. 25, 2006.

(51) Int. Cl.
*H03K 3/013* (2006.01)

(52) U.S. Cl. .......................... 327/292; 327/295; 326/37; 326/39; 326/41; 326/47

(58) Field of Classification Search .................... 326/37, 326/39, 41, 47; 327/292, 295–297, 564–565; 716/6

See application file for complete search history.

(56) References Cited

U.S. PATENT DOCUMENTS

| | | | | |
|---|---|---|---|---|
| 5,394,033 A * | 2/1995 | Tsui et al. | ...................... | 326/41 |
| 5,712,579 A * | 1/1998 | Duong et al. | ................. | 326/93 |
| 5,717,229 A * | 2/1998 | Zhu | ............................. | 257/208 |
| 5,815,726 A * | 9/1998 | Cliff | ............................... | 712/1 |
| 5,892,370 A * | 4/1999 | Eaton et al. | .................... | 326/39 |
| 5,903,165 A * | 5/1999 | Jones et al. | .................... | 326/39 |
| 6,006,025 A * | 12/1999 | Cook et al. | ..................... | 716/14 |
| 6,191,609 B1 * | 2/2001 | Chan et al. | ...................... | 326/38 |
| 6,292,930 B1 * | 9/2001 | Agrawal et al. | ............... | 716/16 |
| 6,353,352 B1 * | 3/2002 | Sharpe-Geisler | ............ | 327/295 |
| 6,426,649 B1 * | 7/2002 | Fu et al. | ........................ | 326/41 |
| 6,480,025 B1 * | 11/2002 | Altaf | ............................. | 326/39 |
| 6,573,757 B1 * | 6/2003 | Gallagher | .................... | 326/101 |
| 6,701,507 B1 * | 3/2004 | Srinivasan | .................... | 716/10 |
| 6,867,616 B1 * | 3/2005 | Venkata et al. | ................. | 326/41 |
| 6,996,736 B1 * | 2/2006 | Nguyen et al. | .............. | 713/500 |
| 7,075,365 B1 | 7/2006 | Starr et al. | | |
| 7,145,362 B1 * | 12/2006 | Bergendahl et al. | ........... | 326/47 |
| 7,167,023 B1 * | 1/2007 | Pan et al. | ........................ | 326/41 |
| 2003/0101423 A1 * | 5/2003 | Thorp et al. | .................... | 716/6 |
| 2006/0006918 A1 * | 1/2006 | Saint-Laurent | .............. | 327/295 |

* cited by examiner

*Primary Examiner*—James H. Cho
*Assistant Examiner*—Jason Crawford
(74) *Attorney, Agent, or Firm*—Ropes & Gray LLP; Jeffrey H. Ingerman

(57) ABSTRACT

A programmable logic device (PLD) includes a signal distribution network, separate from the high-quality, low-skew clock distribution networks of the PLD, for distributing, from peripheral input/output regions of the PLD, clock-type signals. The signal distribution network includes a central periphery clock bus, located near a group of peripheral input/output regions, for conducting clock-type signals from those regions onto a clock spine of the PLD. The clock spine may be dedicated to the signal distribution network, or may be part of a high-quality, low-skew clock distribution network covering all or part of the PLD. The signal distribution network allows greater skew than such high-quality, low-skew clock distribution networks, but nevertheless is of higher quality, and allows less skew, than the general programmable interconnect and routing resources.

44 Claims, 4 Drawing Sheets

PERIPHERY CLOCK DISTRIBUTION NETWORK FOR A PROGRAMMABLE LOGIC DEVICE

CROSS REFERENCE TO RELATED APPLICATION

This claims the benefit of copending, commonly-assigned U.S. Provisional Patent Application No. 60/823,556, filed Aug. 25, 2006, which is hereby incorporated by reference herein in its entirety.

BACKGROUND OF THE INVENTION

This invention relates to the distribution of large numbers of clocks or other signals on a programmable logic device. In particular, this invention relates to the distribution of clocks or other signals with acceptable skew without unduly increasing the number of low-skew clock trees.

In the early days of programmable logic devices, global clock signals or other global signals could be distributed using the general global routing resources of the device. Device sizes were small enough that skew was not a particular concern. However, as programmable logic devices became larger, skew became a concern. One solution to the problem of global clock skew or other global signal skew was the development of a clock tree network commonly referred to as an "H-tree," which allowed a clock signal or other global signal to be introduced at a single point on a device and be delivered to all points on the device with minimal skew.

However, as programmable logic device sizes have continued to increase, the amount of metallization resources required to provide H-tree clock networks has increased dramatically. At the same time, the number of clocks and other signals to be distributed widely across a device also has increased dramatically. For example, PLDs frequently incorporate high-speed serial interfaces to accommodate high-speed signalling standards. Clocks derived from such interfaces using clock-data recovery (CDR) or dynamic phase alignment (DPA) techniques may have to be distributed throughout a PLD to wherever the associated data is being used or processed.

It would be desirable to be able to efficiently distribute clocks and other signals in a programmable logic device.

SUMMARY OF THE INVENTION

The present invention provides a new basic clock topology for a peripheral clock network in a large PLD, such as a large field-programmable gate array (FPGA). The traditional H-tree structure preferably is augmented by a large fan-in structure that greatly increases the number of potential high-speed clocks, thereby reducing what is typically a bottleneck for high-speed input/output (I/O) applications.

Known H-tree clock networks are considered to be high-quality clock networks—i.e., they distribute clocks and other signals with minimal skew. Because of their high cost in terms of metallization, these high quality clock networks are usually provided in a limited number. Some user logic designs may require a larger number of clocks or other widely distributed signals than could be implemented with the available H-trees. However, frequently the clocks or other signals required by the user design are not as sensitive to skew as, e.g., the basic global clocks of the PLD. While they are not totally insensitive to skew, and therefore could not effectively be distributed using the general-purpose routing resources of the PLD, they preferably could be distributed, in accordance with the present invention, by one of a number of clock networks that are of lower quality than the H-trees, but preferably of higher quality (i.e., lower skew) than the general-purpose routing resources.

The present invention preferably provides a large number of clock networks that preferably have lower skew than general-purpose routing resources, but may be of lower quality or more limited reach than the high-quality clock networks such as the H-tree clock networks. This preferably allows the high-quality clock networks to be preserved for their original purpose (i.e., the distribution of device-wide clocks), while still providing acceptable distribution for many high-speed clocks and other widely-distributed signals (including, but not limited to, preset and clear signals) required by user logic designs. These high-quality clock networks, which may cover the device globally or only regionally, will be referred to herein, including in the claims that follow, as "wide-area signal networks."

Thus, in accordance with the present invention there is provided a signal network for distributing clock-type signals from peripheral input/output blocks of a programmable logic device to other portions of the programmable logic device. The signal network includes a first dedicated clock-type signal bus having an end at a first location adjacent a first group of the peripheral input/output blocks, and a first plurality of dedicated clock-type signal lines. Each dedicated clock-type signal line in the first plurality of dedicated clock-type signal lines is connected at one end thereof to a respective one of the peripheral input/output blocks in the first group of peripheral input/output blocks and is connected at another end thereof to the first dedicated clock-type signal bus substantially at the first location. The first dedicated clock-type signal bus extends from the first location to a first clock distribution spine on the programmable logic device.

A programmable logic device incorporating such a clock distribution network is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
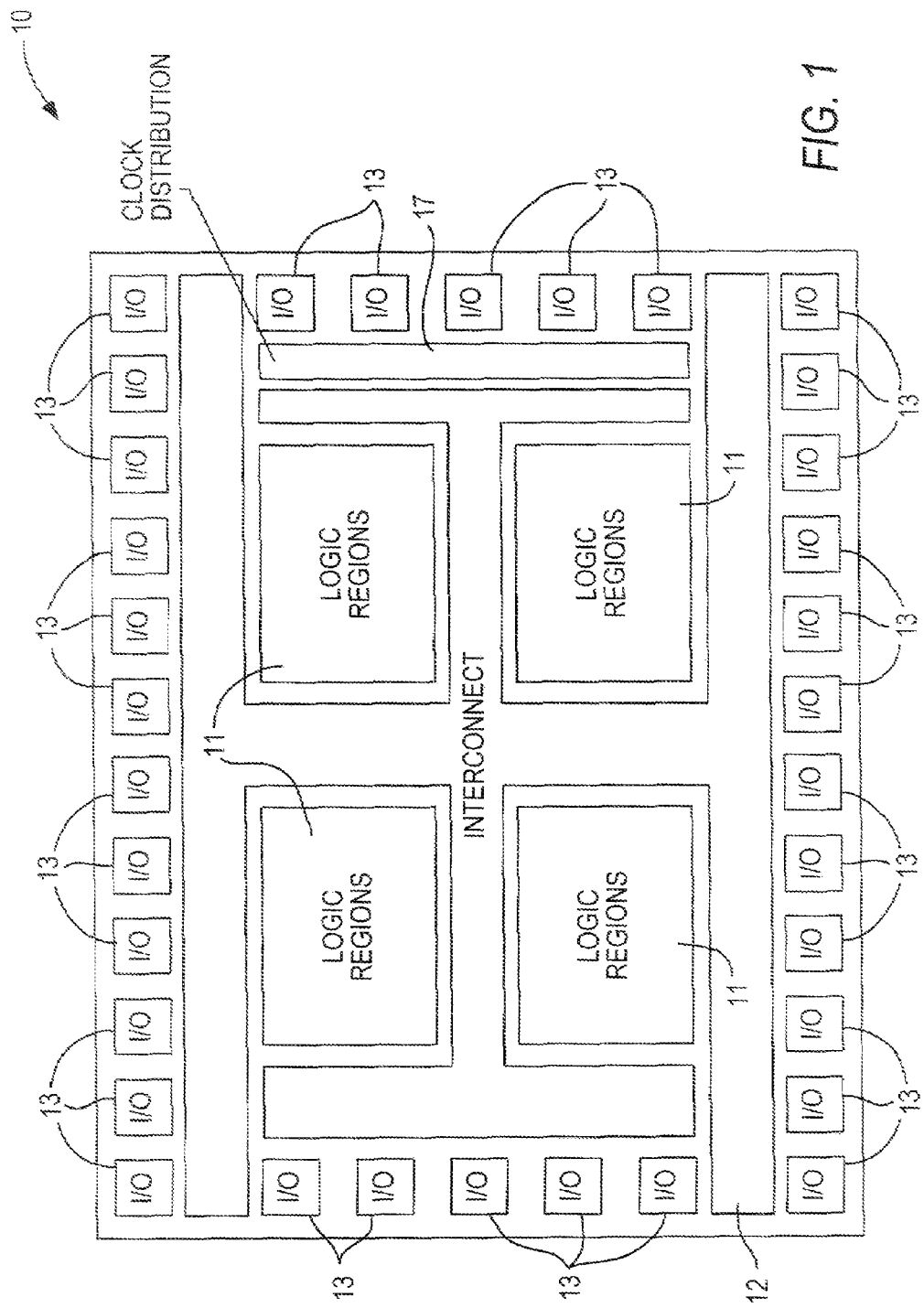
FIG. 1 is a block diagram of a preferred embodiment of a programmable logic device incorporating the present invention.

Known PLDs, such as the STRATIX® family of PLDs available from Altera Corporation, of San Jose, Calif., distribute device-wide clocks using H-tree clock networks of the type described above. For example, in devices in the aforementioned STRATIX® family, one or more H-trees may be available, and clock (or other) signals can be driven onto an entire H-tree or onto quadrants of an H-tree. These clocks may be referred to as global clocks (GCLK) and quadrant clocks (QCLK), and typically their number is substantially independent of device size. On the other hand, the number of potential periphery clocks (PCLK) may increase substantially in direct proportion to the size of the device. That is, as the number of peripheral I/O regions increases, so too does the number of clocks that may need to be distributed over all, or a large portion of, the device from any particular peripheral I/O region.

In accordance with the present invention, clocks derived at the periphery of a PLD may be conducted to a central periphery clock bus from which one or more of them may be driven onto a widely distributed clock network, which may cover the entire device or a substantial portion of the device. The widely distributed clock network could be provided particularly for this purpose. However, in a preferred embodiment of the invention, the widely distributed clock network preferably is the aforementioned H-tree network or other wide-area signal network. In such an embodiment, the peripheral clocks are not conducted from the base of the H-tree, but rather are conducted over different distances to the aforementioned periphery clock bus, thereby potentially introducing some skew between the different clock paths. The central periphery clock bus preferably connects to one or more branches of the H-tree, preferably allowing the selective driving of a clock from the clock bus onto that branch or branches of the H-tree. Normally it would be expected that the destinations for that clock are on the branch, or those branches, of the H-tree. As long as that is the case, it will be appreciated that once the clocks reach the H-tree, substantially no additional skew between clocks is introduced. Moreover, as to any one clock signal, as long as it is being distributed only to that branch of the H-tree, the quality of the clock network, as determined by skew with respect to the various destinations of that clock signal, can be as good as the H-tree.

The PLD may have embedded high-speed transceivers in its I/O regions. Those transceivers may, for example, be arranged in "quads" in accordance with the XAUI standard, and thus may have a plurality of available clocks. Alternatively, the PLD may lack embedded transceivers, but may nevertheless have high-speed serial interfaces including clock-data recovery capability, preferably including dynamic phase alignment. Either way, preferably within the CDR or transceiver circuitry, a selector, which may be a multiplexer, is provided to select an available clock for propagation to the periphery clock bus. If the number of peripheral I/O regions is equal to or less than the number of rows of logic regions in the programmable logic core of the PLD, then preferably every I/O region can drive a clock signal onto the periphery clock bus. However, if the number of peripheral I/O regions is greater than the number of rows of logic regions in the programmable logic core of the PLD, and if the numbers of clocks that can be driven across the various rows of logic is such that the total number of peripheral clocks exceeds the total number of clocks that can be driven across the rows of logic, then preferably there is additional selector circuitry to determine which clocks are driven onto the periphery clock bus.

In accordance with the invention, there is preferably added to each I/O region of a device, such as a STRATIX® II device from Altera Corporation, lacking high-speed transceivers but having high-speed serial interfaces, a 4:1 multiplexer which selects, in accordance with user programming, a clock from among (a) a recovered clock output by DPA or other clock recovery circuitry, (b) a clock signal input directly from an I/O pad, (c) a clock signal generated in the programmable logic core, or (d) ground (in case the user needs to "turn off" a particular input).

Also in accordance with the invention, there is preferably added to each I/O region of a device, such as a STRATIX® II GX device from Altera Corporation, having high-speed transceivers, a 4:1 multiplexer which selects, in accordance with user programming, a clock from among (a) one or more transceiver clocks, which may include (1) the transceiver quad transmit clock, and/or (2) the transceiver quad receive or transceive clock, (b) a clock signal generated in the programmable logic core, or (c) ground (in case the user needs to "turn off" a particular input).

The clocks distributed according to the present invention may be widely distributed but have requirements that are less stringent than the general clock networks, GCLK and QCLK. Alternatively, they may have similarly stringent requirements as do the general clock networks, but require only limited (e.g., regional) distribution. The periphery clock networks preferably meet those requirements, leaving the general wide-area signal networks for use by the more general signals. More importantly, provision of the periphery clock networks allows one to forego providing a separate wide-area clock network for every I/O region from which a clock may have to be distributed, conserving metallization resources.

Traditional high-quality, low-skew clock networks such as H-trees or other wide-area signal networks typically are designed so that no matter where on the device a signal travels, it travels substantially the same distance. In an H-tree, a signal, such as a clock signal, travels to the base of the H-tree (e.g., at about the center of the device), and then travels to its various destinations over branches that are arranged so that the distance traveled by the signal is substantially the same no matter what its source or destination.

First, the source location, as long as all sources are on the periphery of the device, is substantially irrelevant because the base of the H-tree is placed substantially at the center of the device. A signal coming from any I/O region on the periphery of the device will travel substantially the same distance to get to the base of the H-tree as a signal from any other I/O region on the periphery of the device.

Second, the destination location is substantially irrelevant because from the base of an H-tree at the center of a device, a signal travelling to a logic region near the center and to a logic region near the periphery may travel down a trunk of the H-tree to some intermediate point, then down two substantially equal-length branches to the two logic regions. Accordingly, even though one logic region may be very near the starting point at the base of the H-tree, and one logic region may be as far as possible from the base of the H-tree, the total distance traveled by the signal to the two logic regions (including the distance traveled by the signal to reach the base of the H-tree) is substantially the same.

A clock network in accordance with the present invention may not result in a signal travelling substantially the same distance regardless of its destination as in the traditional wide-area signal network. However, the difference in signal travel distance to various destinations preferably is small enough that the resultant amount of skew is acceptable for the signals in question. Or the signals may be distributed over a sufficiently small area that they do travel substantially the same distance regardless of destination.

In accordance with the present invention, preferably one or more centralized periphery clock networks are provided on a PLD. Each periphery clock network preferably includes a central periphery clock bus that accepts clocks and other signals from a plurality of peripheral I/O regions. The central periphery clock bus preferably drives onto a spine of an existing wide-area signal network such as an H-tree network. Preferably, such a periphery clock network is used to distribute clock signals to destinations within a region—e.g., a quadrant—of the PLD, so that any difference in travel distance within that region, and therefore any skew, would be minimal, and may be as low as that of the H-tree.

Similarly, there would be skew between two different signals originating at two different peripheral I/O regions and routed to the same destinations, based on the different distances of the different I/O regions from the central periphery clock bus. However, preferably the central periphery clock bus is arranged so that such differences are minimized and therefore result in only minimal signal-to-signal skew. For example, as shown below, the central periphery clock bus can be arranged at a midpoint of a group of I/O regions, so that at most signals need to travel half the width of the group to reach the central periphery clock bus.

As stated above, the periphery clock network could be a separate network, or could simply include the central periphery clock bus driving onto a portion of the existing wide-area signal network (such as the H-tree). Either way, it preferably would be used to distribute clocks or similar signals to only a portion (e.g., a quadrant) of the device, because even if some skew in the signals could be tolerated, the amount of skew that would result from distributing the signal all over the device may be too great at the opposite end of the device from the signal origin. However, there may be situations in which the degree to which skew in the particular signal can be tolerated is such that the signal could be distributed even over the entire device using the periphery clock network driving onto the wide-area signal network.

In the device portion (e.g., quadrant) over which a particular periphery clock network is distributed, the periphery clock network may include one or more clock spines. Again, these could be dedicated to the periphery clock network or could be portions of one or more existing wide-area signal networks. If the periphery clock network includes multiple such spines (which would almost always be the case if an existing network is being used, but may not be the case in a dedicated network), there may be some skew from one spine to the other because the signal is travelling from the periphery to each spine via the same central periphery clock bus. However, as discussed above, because the network is limited to a portion of the device, the amount of skew is expected to be low, and may be tolerable. In any event, when programming the device, the periphery clock network would only be used to distribute a clock if the skew that might result could be tolerated.

The invention will now be described with reference to FIGS. 1-3.

PLD 10, shown schematically in FIG. 1, is one example of a device incorporating a peripheral clock distribution network according to the invention. PLD 10 has a programmable logic core including programmable logic regions 11 accessible to programmable interconnect structure 12. The layout of regions 11 and interconnect structure 12 as shown in FIG. 1 is intended to be schematic only, as many actual arrangements are known to, or may be created by, those of ordinary skill in the art.

PLD 10 also includes a plurality of I/O regions 13. I/O regions 13 preferably are programmable, allowing the selection of one of a number of possible I/O signalling schemes, which may include differential and/or non-differential signalling schemes. Alternatively, I/O regions 13 may be fixed, each allowing only a particular signalling scheme. In some embodiments, a number of different types of fixed I/O regions 13 may be provided, so that while an individual region 13 does not allow a selection of signalling schemes, nevertheless PLD 10 as a whole does allow such a selection.

Like the layout of logic regions 11 and interconnect 12, the layout of I/O regions 13 on device 10 as shown in the drawings is schematic. Logic regions 11 preferably are arranged in rows of logic, and each I/O region 13 may or may not line up with an individual row of logic. For example, in one preferred embodiment, there may be two I/O regions 13, and hence two peripheral clock signals, for every three rows of logic regions 11.

Any of I/O regions 13 could generate or recover a signal, such as a clock signal, that is to be distributed by a periphery clock network in accordance with the present invention, or could receive such a signal from outside PLD 10.

Figure 2:
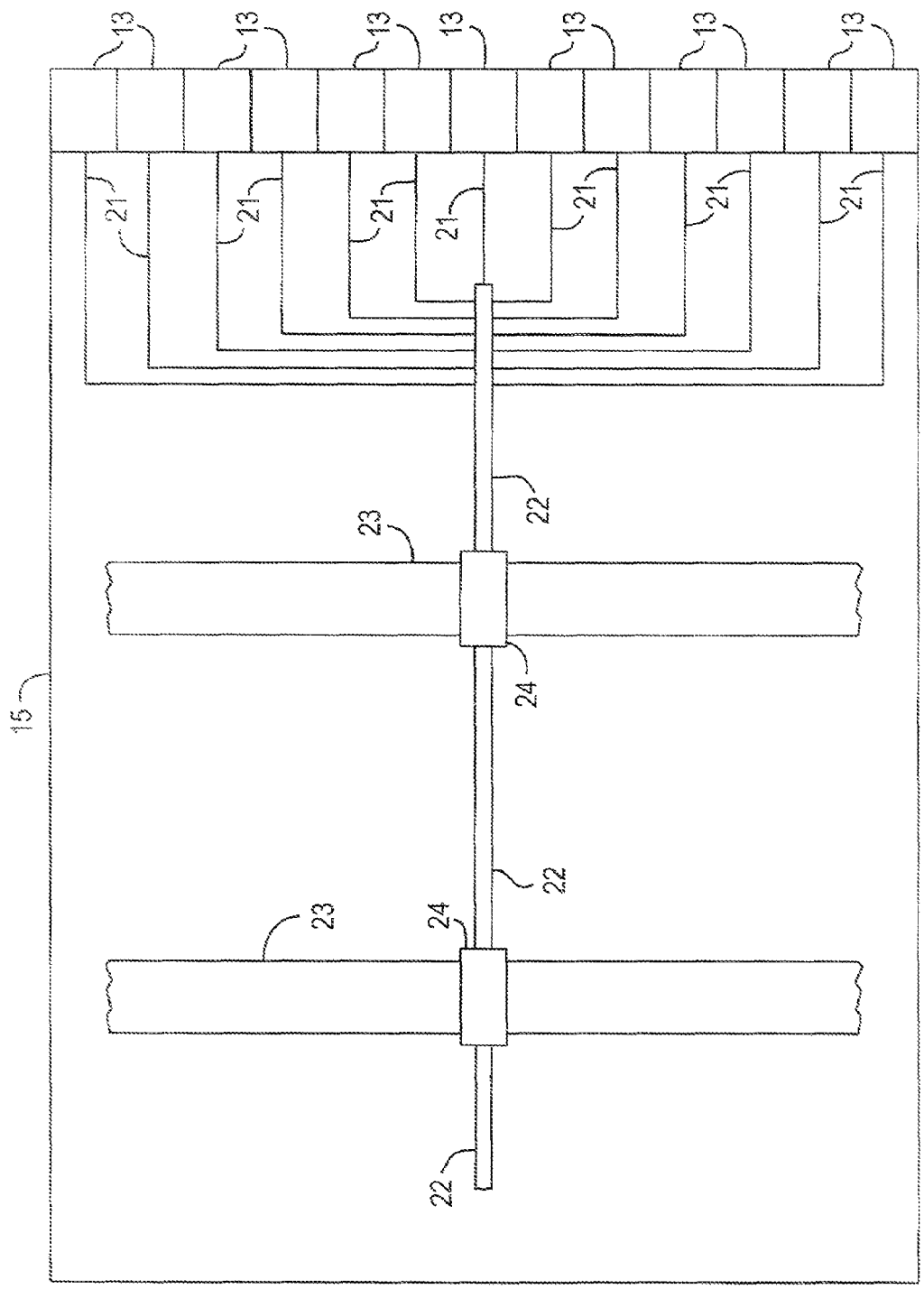
FIG. 2 is a representation of a first preferred embodiment of a periphery clock network in accordance with the present invention.

FIG. 2 shows a first preferred embodiment of a periphery clock network 20 in accordance with the present invention, for distributing clocks or similar signals throughout a portion (e.g., a quadrant) 15 of PLD 10. As shown, periphery clock network 20, at least a portion of which may occupy at least part of clock distribution region 17, preferably includes respective individual clock lines 21 from the individual peripheral I/O regions 13, which conduct respective individual clocks (which may have been selected within each region as discussed above), onto the periphery clock network bus 22. As discussed above, periphery clock network bus 22 preferably is located at or near a midpoint of portion 15 of PLD 10 to minimize signal-to-signal skew.

Each of individual clock lines 21 may be directly connected to periphery clock network bus 22. Alternatively, one or more of individual clock lines 21 may be selectably connectable to periphery clock network bus 22 through, e.g., a respective multiplexer (not shown).

Periphery clock network bus 22 preferably drives periphery clock network spine 23, which preferably is a portion of a wide-area signal network of PLD 10. However, as also discussed above, periphery clock network spine 23 could be a separate, dedicated clock spine. In either case, periphery clock network bus 22 preferably drives spine 23 via a driver/multiplexer 24. Driver/multiplexer 24 preferably includes a number of 4:1 multiplexers (not separately shown) equal to the number of tracks in clock spine 23.

Each of those 4:1 multiplexers preferably selects as inputs from among GCLK signals, QCLK signals, PLL feedback signals (from phased-lock loop circuitry that provides the clock signals), ground, and PCLK signals from bus 22. In a preferred embodiment, there are 26 tracks in clock spine 23, meaning that there are 26 4:1 multiplexers for a total of 104 multiplexer inputs. In that same preferred embodiment, there preferably are 16 GCLK signals, 16 or 22 QCLK signals, 16 PCLK signals, 6 PLL feedback signals and ground, for a total of either 55 or 61 possible inputs. Thus, some of the signals—preferably those which are more likely to be used often—may be input to more than one of the 4:1 multiplexers.

In the embodiment of FIG. 2, there are two clock spines 23 in quadrant 15 of PLD 10, but there may be only one such spine 23 or there may be more than two such spines 23 (not shown). Clock spine 23 may be a portion of a wide-area signal network of PLD 10. In any embodiment with more than one clock spine 23, periphery clock network bus 22 may be extended to drive onto one or more of the additional clock spine segments. In such an embodiment, there might be additional skew introduced because of the different distances that a signal would have to travel along periphery clock network bus 22 to each clock spine segment, but clock signals would only be routed to more than one spine in a user design where that amount of skew was considered acceptable.

Figure 3:
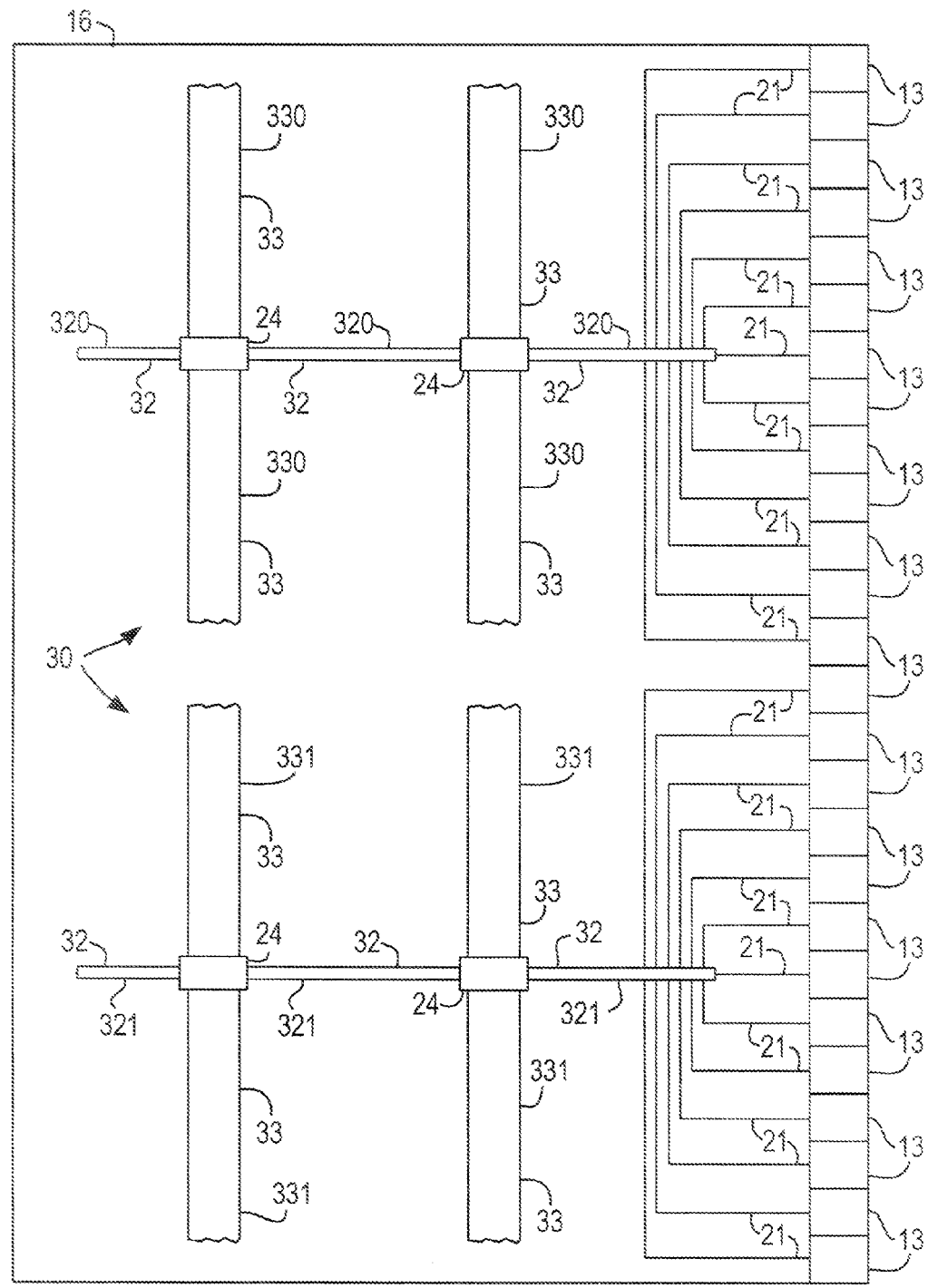
FIG. 3 is a representation of a second preferred embodiment of a periphery clock network in accordance with the present invention.

FIG. 3 shows a second preferred embodiment of the present invention in which a quadrant 16 of PLD 10 includes a periphery clock network 30 having not only multiple clock spine segments 33 (which may be dedicated or may be portions of one or more wide-area signal networks), but also multiple periphery clock network buses 32. The individual clocks are driven onto multiple clock spine segments of the PLD. In the embodiment shown in FIG. 3, quadrant 16 of PLD 10 has four clock spine segments 33, which may belong to one wide-area signal network, or to two, three or four wide-area signal networks. In this embodiment, a first, upper half of the periphery clocks can be driven onto an upper one 320 of periphery clock network buses 32, which in turn drives onto two upper ones 330 of clock spine segments 33 through respective driver/multiplexers 24, while a second, lower half of the periphery clocks can be driven onto a lower one 321 of periphery clock network buses 32, which in turn drives onto two lower ones 331 of clock spine segments 33 through respective driver/multiplexers 24. It will be recognized, however, that it is within the invention to allow either periphery clock network bus 320, 321 network to drive onto only one of respective clock spine segments 330 or one of respective clock spine segments 331.

Figure 4:
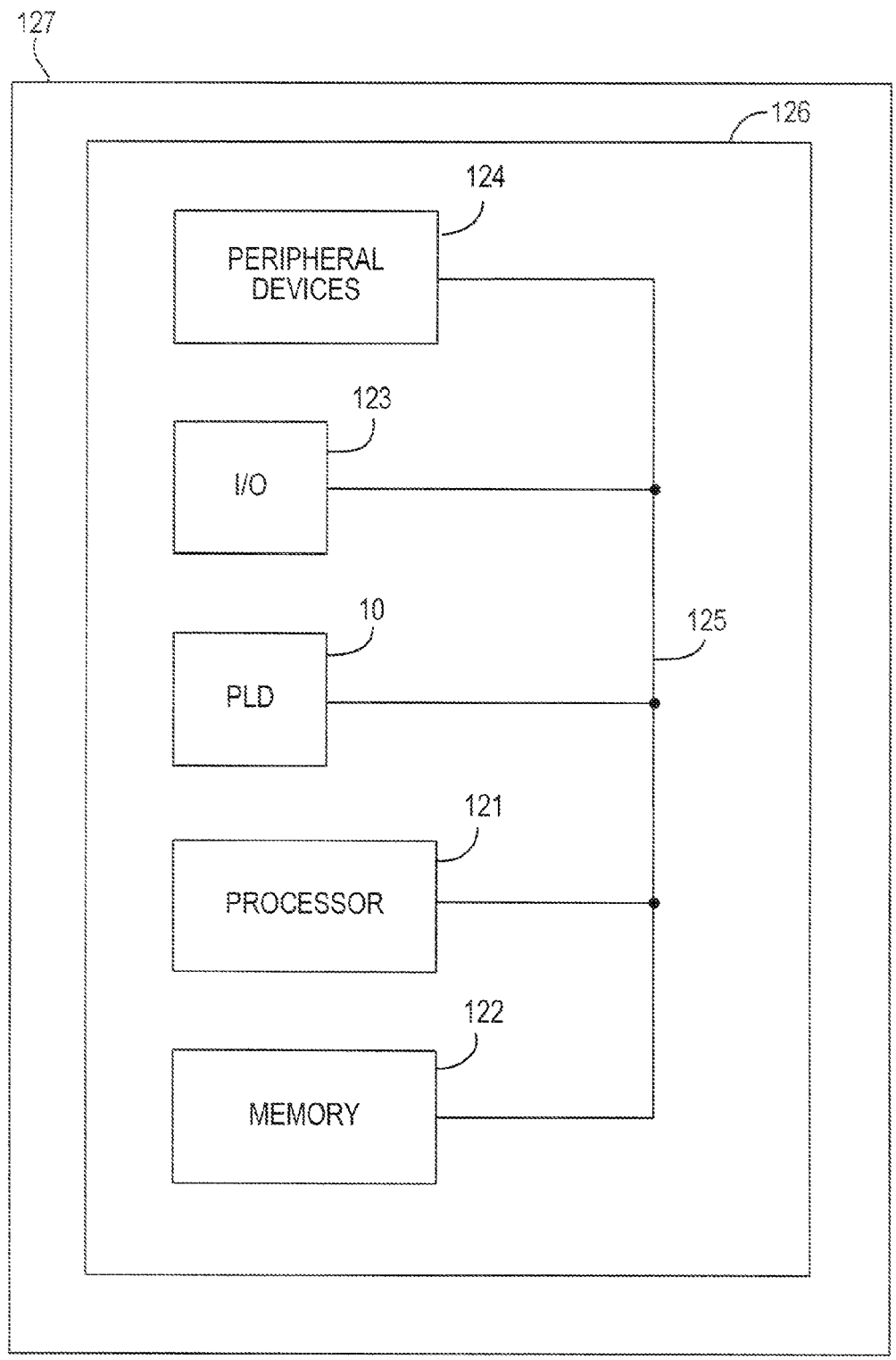
FIG. 4 is a simplified block diagram of an illustrative system employing a programmable logic device incorporating a periphery clock network in accordance with the present invention.

A PLD 10 incorporating periphery clock networks 20, 30 according to the present invention may be used in many kinds of electronic devices. One possible use is in a data processing system 120 shown in FIG. 4. Data processing system 120 may include one or more of the following components: a processor 121; memory 122; I/O circuitry 123; and peripheral devices 124. These components are coupled together by a system bus 125 and are populated on a circuit board 126 which is contained in an end-user system 127.

System 120 can be used in a wide variety of applications, such as computer networking, data networking, instrumentation, video processing, digital signal processing, or any other application where the advantage of using programmable or reprogrammable logic is desirable. PLD 10 can be used to perform a variety of different logic functions. For example, PLD 10 can be configured as a processor or controller that works in cooperation with processor 121. PLD 10 may also be used as an arbiter for arbitrating access to a shared resources in system 120. In yet another example, PLD 10 can be configured as an interface between processor 121 and one of the other components in system 120. It should be noted that system 120 is only exemplary, and that the true scope and spirit of the invention should be indicated by the following claims.

Various technologies can be used to implement PLDs 10 as described above and incorporating this invention.

It will be understood that the foregoing is only illustrative of the principles of the invention, and that various modifications can be made by those skilled in the art without departing from the scope and spirit of the invention. One skilled in the art will appreciate that the present invention is not limited by the disclosed embodiments, which are presented for purposes of illustration and not of limitation, and the present invention is limited only by the claims that follow.

What is claimed is:

1. A signal network on a programmable logic device for distributing clock-type signals from peripheral input/output blocks of said programmable logic device to other portions of said programmable logic device, said signal network comprising:
   a device-wide dedicated, low-skew clock-type signal distribution network on said programmable logic device, arranged so that distances traveled by a signal from an entry point of said device-wide dedicated, low-skew clock-type signal distribution network to any destination on said programmable logic device are substantially equal; and
   a second dedicated clock-type signal distribution network on said programmable logic device, comprising:
      a first dedicated clock-type signal bus on said programmable logic device separate from said device-wide dedicated, low-skew clock-type signal distribution network, and having an end at a first location adjacent a first group of said peripheral input/output blocks, and
      a first plurality of dedicated clock-type signal lines on said programmable logic device, each dedicated clock-type signal line in said first plurality of said dedicated clock-type signal lines being separate from said device-wide dedicated, low-skew clock-type signal distribution network, having a first dedicated connection at one end thereof to a respective one of said peripheral input/output blocks in said first group of peripheral input/output blocks, and being connected at another end thereof to said first dedicated clock-type signal bus substantially at said first location; wherein:
   said first dedicated clock-type signal bus extends from said first location to a first clock distribution spine on said programmable logic device.

2. The signal network of claim 1 wherein said first clock distribution spine extends over at least a substantial portion of said programmable logic device.

3. The signal network of claim 2 wherein said first clock distribution spine is a portion of a larger clock distribution network of said programmable logic device.

4. The signal network of claim 3 wherein said larger clock distribution network is said device-wide dedicated, low-skew clock-type signal distribution network of said programmable logic device.

5. The signal network of claim 3 wherein said larger clock distribution network comprises a second clock distribution spine and said dedicated clock-type signal bus extends also to said second clock distribution spine.

6. The signal network of claim 5 further comprising a selectable connection between said dedicated clock-type signal bus and each of said first and second clock distribution spines.

7. The signal network of claim 1 wherein said programmable logic device comprises a second clock distribution spine and said dedicated clock-type signal bus extends also to said second clock distribution spine.

8. The signal network of claim 7 further comprising a selectable connection between said dedicated clock-type signal bus and each of said first and second clock distribution spines.

9. The signal network of claim 1 further comprising a selectable connection between said dedicated clock-type signal bus and said first clock distribution spine.

10. The signal network of claim 1 wherein said second dedicated clock-type signal distribution network further comprises a selectable connection between said plurality of dedicated clock-type signal lines and said dedicated clock-type signal bus.

11. The signal network of claim 1 wherein said second dedicated clock-type signal distribution network further comprises:
    a second dedicated clock-type signal bus on said programmable logic device separate from said device-wide dedicated, low-skew clock-type signal distribution network, and having an end at a second location adjacent a second group of said peripheral input/output blocks; and
    a second plurality of dedicated clock-type signal lines on said programmable logic device, each dedicated clock-type signal line in said second plurality of dedicated clock-type signal lines being separate from said device-wide dedicated, low-skew clock-type signal distribution network, having a second dedicated connection at one end thereof to a respective one of said peripheral input/output blocks in said second group of peripheral input/output blocks, and being connected at another end thereof to said second dedicated clock-type signal bus substantially at said second location; wherein:

said second dedicated clock-type signal bus extends from said second location to a second clock distribution spine on said programmable logic device.

12. The signal network of claim 11 wherein said second clock distribution spine extends over at least a substantial portion of said programmable logic device.

13. The signal network of claim 12 wherein said first and second clock distribution spines are portions of a single larger clock distribution network of said programmable logic device.

14. The signal network of claim 13 wherein said single larger clock distribution network is said device-wide dedicated, low-skew clock-type signal distribution network of said programmable logic device.

15. The signal network of claim 12 wherein each of said first and second clock distribution spines is a portion of a respective larger clock distribution network of said programmable logic device.

16. The signal network of claim 15 wherein at least one said respective larger clock distribution network is said device-wide dedicated, low-skew clock-type signal distribution network of said programmable logic device.

17. The signal network of claim 11 wherein at least one respective one of said first and second locations is located substantially at a midpoint relative to its respective one of said first and second groups of peripheral input/output blocks; whereby:

for each respective peripheral input/output block in said respective one of said first and second groups of peripheral input/output blocks, there is at least one other one of said peripheral input/output blocks that is substantially equally distant from said respective one of first and second locations.

18. The signal network of claim 1 wherein:

said programmable logic device further comprises programmable interconnect for programmably routing signals within and among said peripheral input/output blocks and said other portions; and said at least one wide-area, low-skew signal network is separate from said programmable interconnect.

19. A programmable logic device comprising:

regions of programmable logic;

a plurality of peripheral input/output blocks;

programmable interconnect for programmably routing signals within and among said regions of programmable logic and said plurality of peripheral input/output blocks;

at least one wide-area, low-skew signal network on said programmable logic device for distributing clock-type signals within said programmable logic device, arranged so that distances traveled by a signal from an entry point of said at least one wide-area, low-skew signal network to any destination on said programmable logic device are substantially equal; and a second signal network on said programmable logic device at least partially separate from said at least one wide-area, low-skew signal network, for distributing clock-type signals from at least one of said peripheral input/output blocks, said second signal network comprising:

a first dedicated clock-type signal bus on said programmable logic device separate from said device-wide dedicated, low-skew clock-type signal distribution network, and having an end at a first location adjacent a first group of said peripheral input/output blocks, and a first plurality of dedicated clock-type signal lines on said programmable logic device, each dedicated clock-type signal line in said first plurality of said dedicated clock-type signal lines being separate from said device-wide dedicated, low-skew clock-type signal distribution network, having a first dedicated connection at one end thereof to a respective one of said peripheral input/output blocks in said first group of peripheral input/output blocks, and being connected at another end thereof to said first dedicated clock-type signal bus substantially at said first location; wherein:

said first dedicated clock-type signal bus extends from said first location to a first clock distribution spine on said programmable logic device.

20. The programmable logic device of claim 19 wherein said first clock distribution spine extends over at least a substantial portion of said programmable logic device.

21. The programmable logic device of claim 20 wherein said first clock distribution spine is a portion of one of said at least one wide-area, low-skew signal network.

22. The programmable logic device of claim 21 wherein said one of said at least one wide-area, low-skew signal network is a device-wide low-skew clock distribution network of said programmable logic device.

23. The programmable logic device of claim 21 wherein said one of said at least one wide-area, low-skew signal network comprises a second clock distribution spine and said dedicated clock-type signal bus extends also to said second clock distribution spine.

24. The programmable logic device of claim 23 further comprising a selectable connection between said dedicated clock-type signal bus and each of said first and second clock distribution spines.

25. The programmable logic device of claim 19 further comprising a second clock distribution spine, wherein said dedicated clock-type signal bus extends also to said second clock distribution spine.

26. The programmable logic device of claim 25 further comprising a selectable connection between said dedicated clock-type signal bus and each of said first and second clock distribution spines.

27. The programmable logic device of claim 19 further comprising a selectable connection between said dedicated clock-type signal bus and said first clock distribution spine.

28. The programmable logic device of claim 19 wherein said second signal network further comprises a selectable connection between said plurality of dedicated clock-type signal lines and said dedicated clock-type signal bus.

29. The programmable logic device of claim 19 wherein said second signal network further comprises:

a second dedicated clock-type signal bus on said programmable logic device separate from said device-wide dedicated, low-skew clock-type signal distribution network, and having an end at a second location adjacent a second group of said peripheral input/output blocks; and a second plurality of dedicated clock-type signal lines on said programmable logic device, each dedicated clock-type signal line in said second plurality of dedicated clock-type signal lines being separate from said device-wide dedicated, low-skew clock-type signal distribution network, having a second dedicated connection at one end thereof to a respective one of said peripheral input/output blocks in said second group of peripheral input/ output blocks, and being connected at another end thereof to said second dedicated clock-type signal bus substantially at said second location; wherein:

said second dedicated clock-type signal bus extends from said second location to a second clock distribution spine on said programmable logic device.

30. The programmable logic device of claim 29 wherein said second clock distribution spine extends over at least a substantial portion of said programmable logic device.

31. The programmable logic device of claim 30 wherein said first and second clock distribution spines are portions of a single one of said at least one wide-area, low-skew signal network of said programmable logic device.

32. The programmable logic device of claim 31 wherein said single one of said at least one wide-area, low-skew signal network is a device-wide, low-skew clock distribution network of said programmable logic device.

33. The programmable logic device of claim 30 wherein each of said first and second clock distribution spines is a portion of a respective one of said least one wide-area, low-skew signal network of said programmable logic device.

34. The programmable logic device of claim 33 wherein at least one said respective wide-area, low-skew signal network is a device-wide, low-skew clock distribution network of said programmable logic device.

35. The programmable logic device of claim 29 wherein at least one respective one of said first and second locations is located substantially at midpoint relative to its respective one of said first and second groups of peripheral input/output blocks; whereby:

for each respective peripheral input/output block in said respective one of said first and second groups of peripheral input/output blocks, there is at least one other one of said peripheral input/output blocks that is substantially equally distant from said respective one of first and second locations.

36. The programmable logic device of claim 19 wherein: said at least one wide-area, low-skew signal network is separate from said programmable interconnect.

37. A programmable logic device including (a) at least one wide-area, low-skew signal network on said programmable logic device, arranged so that distances traveled by a signal from an entry point of said at least one wide-area, low-skew signal network to any destination on said programmable logic device are substantially equal, for distributing clock-type signals within said programmable logic device, (b) a periphery clock network, and (c) a clock spine, wherein (1) the periphery clock network comprises a collection of individual dedicated clock networks on said programmable logic device separate from said wide-area, low-skew signal network, (2) clock signals are driven over at least one of said individual dedicated clock networks from a periphery of the programmable logic device to the clock spine, and (3) each of said individual dedicated clock networks has a dedicated connection to said periphery.

38. The programmable logic device of claim 37, further comprising:

rows of logic regions; and
a first number of said individual dedicated clock networks for each of a second number of said rows of logic regions.

39. The programmable logic device of claim 38 wherein said first number is 2 and said second number is 3.

40. The programmable logic device of claim 37, said programmable logic device further comprising:

a plurality of regions, each of said regions including (a) a separate clock spine, said clock spine having two segments, and (b) a separate periphery clock network; wherein:

the separate periphery clock network is connected to the two segments of the separate clock spine by at least a multiplexer.

41. The programmable logic device of claim 37, said programmable logic device further comprising:

a plurality of regions, each of said regions including (a) four separate clock spines, each of said clock spines having two segments, and (b) two separate periphery clock networks: wherein:

a first one of said separate periphery clock networks is connected to said two segments of each of a first two of said clock spines by at least a first multiplexer; and a second one of said separate periphery clock networks is connected to said two segments of each of a second two of said clock spines by at least a second multiplexer.

42. The programmable logic device of claim 37 further comprising:

programmable interconnect for programmably routing signals within and among regions of programmable logic and a plurality of peripheral input/output blocks; wherein:

said at least one wide-area, low-skew signal network is separate from said programmable interconnect.

43. A clock-type signal network on a programmable logic device, said clock-type signal network comprising:

a device-wide dedicated, low-skew clock-type signal distribution network, arranged so that distances traveled by a clock-type signal from an entry point of said device-wide dedicated, low-skew signal distribution network to any destination on said programmable logic device are substantially equal;

a first dedicated clock-type signal bus separate from said device-wide dedicated, low-skew clock-type signal distribution network, the first dedicated clock-type signal bus having an end at a first location adjacent a first group of peripheral input/output blocks on said programmable logic device; and a first plurality of dedicated clock-type signal lines, each dedicated clock-type signal line in said first plurality of said dedicated clock-type signal lines being separate from said device-wide dedicated, low-skew clock-type signal distribution network, having a dedicated connection at one end thereof to a respective one of said peripheral input/output blocks in said first group of peripheral input/output blocks, and being connected at another end thereof to said first dedicated clock-type signal bus substantially at said first location; wherein:

said first dedicated clock-type signal bus extends from said first location to said device-wide dedicated, low-skew clock-type signal distribution network.

44. A programmable logic device including (a) a wide-area, low-skew signal network for distributing clock-type signals within said programmable logic device, arranged so that distances traveled by a clock-type signal from an entry point of said wide-area, low-skew signal network to any destination on said programmable logic device are substantially equal, and (b) a periphery clock network, wherein (1) the periphery clock network comprises a collection of individual dedicated clock networks separate from said wide-area, low-skew signal network, (2) clock-type signals are driven over at least one of said individual dedicated clock networks from a periphery of the programmable logic device to the wide-area, low-skew signal network, and (3) each of said individual dedicated clock networks has a dedicated connection to said periphery.

* * * * *